(12) United States Patent
Kitamura et al.

(10) Patent No.: US 11,268,869 B2
(45) Date of Patent: Mar. 8, 2022

(54) SLIP SENSOR

(71) Applicant: MINEBEA MITSUMI Inc., Nagano (JP)

(72) Inventors: Atsushi Kitamura, Shizuoka (JP); Shigeyuki Adachi, Shizuoka (JP); Toshiaki Asakawa, Shizuoka (JP); Satoshi Suzuki, Tokyo (JP); Shinya Yamaguchi, Tokyo (JP); Hirotsugu Iijima, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/270,994

(22) PCT Filed: Aug. 27, 2019

(86) PCT No.: PCT/JP2019/033493
§ 371 (c)(1),
(2) Date: Apr. 27, 2021

(87) PCT Pub. No.: WO2020/045419
PCT Pub. Date: Mar. 5, 2020

(65) Prior Publication Data
US 2021/0262879 A1    Aug. 26, 2021

(30) Foreign Application Priority Data
Aug. 27, 2018 (JP) .............................. JP2018-158607

(51) Int. Cl.
*G01L 5/1627*   (2020.01)
*G01L 1/22*     (2006.01)

(52) U.S. Cl.
CPC .......... *G01L 5/1627* (2020.01); *G01L 1/2287* (2013.01)

(58) Field of Classification Search
CPC ............................ G01L 5/1627; G01L 1/2287
See application file for complete search history.

(56) References Cited

U.S. PATENT DOCUMENTS

| 4,687,885 A | * | 8/1987 | Talmage, Jr. | ........... G01L 1/205 178/18.05 |
| 2014/0160066 A1 | * | 6/2014 | Kim | .................... G02F 1/13338 345/174 |

(Continued)

FOREIGN PATENT DOCUMENTS

| CN | 105094449 | 11/2015 |
| JP | 2011-209103 | 10/2011 |

(Continued)

OTHER PUBLICATIONS

International Search Report for PCT/JP2019/033493 dated Nov. 19, 2019.

*Primary Examiner* — Max H Noori
(74) *Attorney, Agent, or Firm* — IPUSA, PLLC

(57) ABSTRACT

A slip sensor includes a first insulating layer, a second insulating layer, and a member configured to elastically deform in accordance with a force. A difference between a resistance value set between a given pair of electrodes associated with a given first resistive portion and a resistance value set between a given pair of electrodes associated with a given second resistive portion facing the given first resistive portion continuously varies in accordance with elastic deformation of the member that is caused by a shear force.

19 Claims, 11 Drawing Sheets

(56) References Cited

U.S. PATENT DOCUMENTS

| | | | |
|---|---|---|---|
| 2015/0301660 A1* | 10/2015 | Watazu | G09G 3/36 |
| | | | 345/173 |
| 2017/0219447 A1 | 8/2017 | Ovaere et al. | |
| 2017/0315658 A1* | 11/2017 | Vandermeijden | G06F 3/0446 |
| 2018/0003577 A1* | 1/2018 | Podoloff | G01L 1/2287 |
| 2018/0059839 A1* | 3/2018 | Kim | H01L 51/5284 |
| 2018/0117772 A1 | 5/2018 | Ikebe | |
| 2018/0172527 A1 | 6/2018 | Kim et al. | |
| 2020/0093202 A1* | 3/2020 | Bae | G06F 3/01 |

FOREIGN PATENT DOCUMENTS

| | | |
|---|---|---|
| JP | 2015-059845 | 3/2015 |
| JP | 2016-121975 | 7/2016 |
| JP | 2018-069385 | 5/2018 |

\* cited by examiner

SLIP SENSOR

TECHNICAL FIELD

The present invention relates to a slip sensor.

BACKGROUND

Various sensors for detecting strain have been discussed in recent years. For example, as such a sensor, a strip-shaped strain sensor is used, where a resistance value varies in accordance with expansion or contraction of the strain sensor in a longitudinal direction, and a pair of stoppers is provided on both end portions of the strain sensor in the longitudinal direction (for example, see Patent document 1). In order to detect strain, a capacitive-type sensor is also used in some cases (for example, see Patent document 2).

CITATION LIST

Patent Document

[Patent document 1] Japanese Unexamined Patent Application Publication No. 2016-121975
[Patent document 2] Japanese Unexamined Patent Application Publication No. 2015-59845

SUMMARY

However, slip sensors are not conventionally proposed to allow for detection of slip that is caused between objects to contact the slip sensors and the slip sensors, with high accuracy.

In view of the point described above, an object of the present invention is to provide a slip sensor that allows for detection of slip that is caused between a contacted object and the slip sensor, with high accuracy.

A slip sensor includes a first insulating layer of which one side is a side of receiving a force and of which another side includes multiple first resistive portions, the first resistive portions, of which a longitudinal direction of each is directed to a first direction, being juxtaposed. The slip sensor includes a second insulating layer of which one side includes multiple second resistive portions, the second resistive portions, of which a longitudinal direction of each is directed to the first direction, being juxtaposed. The slip sensor includes a member disposed between the another side of the first insulating layer and the one side of the second insulating layer, the member being configured to elastically deform in accordance with the force. Each first resistive portion is disposed facing a given second resistive portion, the member being provided between a given first resistive portion and the given second resistive portion. A pair of electrodes is provided on both end portions of each of the first resistive portions and the second resistive portions. A difference between a resistance value set between a given pair of electrodes associated with a given first resistive portion and a resistance value set between a given pair of electrodes associated with a given second resistive portion facing the given first resistive portion continuously varies in accordance with elastic deformation of the member that is caused by a shear force.

EFFECTS OF THE INVENTION

According to the disclosed technique, a slip sensor can be provided to allow for detection of slip that is caused between a contacted object and the slip sensor, with high accuracy.

DESCRIPTION OF EMBODIMENTS

One or more embodiments will be hereafter described with reference to the drawings. In each figure, the same numerals denote the same components and duplicative descriptions for the components may be omitted.

First Embodiment

Figure 1:
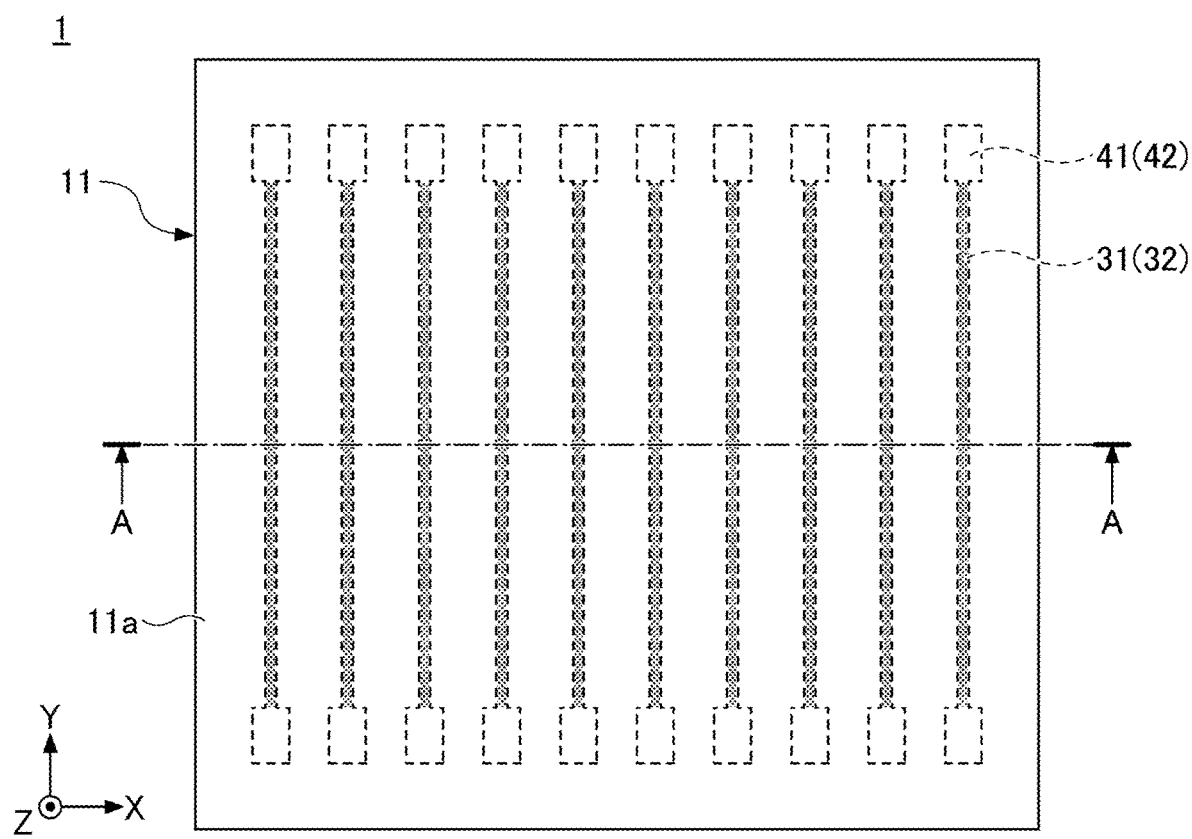
FIG. 1 is a plan view illustrating an example of a slip sensor according to a first embodiment.
Figure 2:
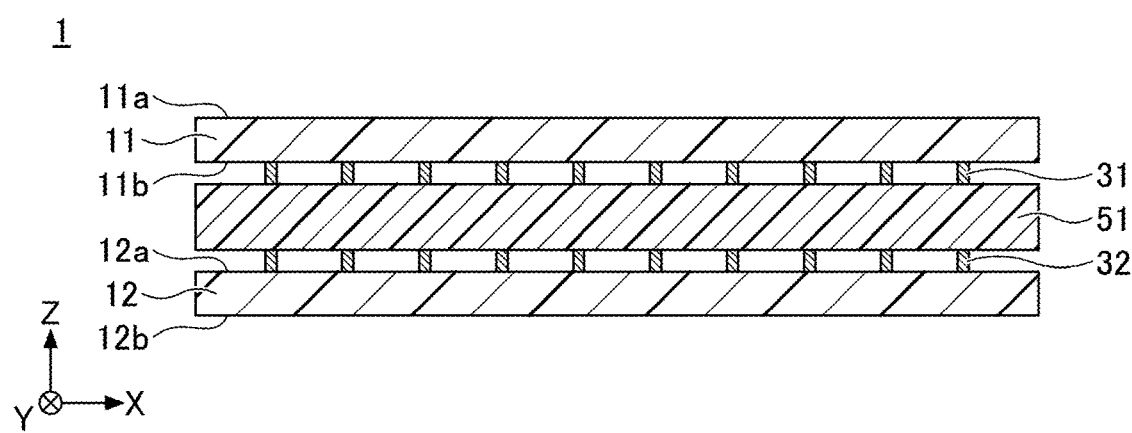
FIG. 2 is a cross-sectional view (first part) illustrating an example of the slip sensor according to the first embodiment.

FIG. 1 is a plan view illustrating an example of a slip sensor according to a first embodiment. FIG. 2 is a cross-sectional view illustrating an example of the slip sensor according to the first embodiment, and illustrates the cross section of the slip sensor taken along the A-A line in FIG. 1. Referring to FIGS. 1 and 2, a slip sensor 1 includes substrates 11 and 12, resistive portions 31 and 32, terminal sections 41 and 42, and a member 51.

Note that in the present embodiment, for the sake of convenience, in the slip sensor 1, the side of the substrate 11 where the resistive portions 31 are not provided is referred to as an upper side or one side, and the side of the substrate 12 where the resistive portions 32 are not provided is referred to as a lower side or another side. Further, for each component, the surface on the side where one or more resistive portions 31 on or above the substrate 11 are not provided is referred to as one surface or an upper surface, and the surface on the side where one or more resistive portions 32 on or above the substrate 12 are not provided is referred to as another surface or a lower surface. However, the slip sensor 1 can be used in a state of being upside down, or be disposed at any angle. Further, a plan view means that an object is viewed from a direction normal to an upper surface lie of the substrate 11, and a planar shape refers to a shape of an object when viewed from the direction normal to the upper surface 11a of the substrate 11.

The slip sensor 1 has a structure in which the substrate 11 and the substrate 12 are laminated such that the member 51 capable of elastically deforming is provided between the lower surface 11b of the substrate 11 and the upper surface 12a of the substrate 12, where the resistive portions 31 are formed on the lower surface 11b of the substrate 11, and the resistive portions 32 are formed on the upper surface 12a of the substrate 12. Each of the resistive portions 31 is disposed facing a given resistive portion 32, and the member 51 is provided between a given resistive portion 31 and the given resistive portion 32. A pair of terminal sections 41 is provided on both end portions of each resistive portion 31, and a pair of terminal sections 42 is provided on both end portions of each resistive portion 32.

In the slip sensor 1, for example, the upper surface 11a of the substrate 11 is a side of receiving a force, and when a given force (a shear force or a compressive force) from a contacted object is applied to the substrate 11, the member 51 elastically deforms in accordance with the given force from the contacted object. In this description, the shear force refers to a force acting parallel to the upper surface 11a of the substrate 11, and the compressive force refers to a force acting perpendicular to the upper surface 11a of the substrate 11.

A difference between a resistance value set between the pair of terminal sections 41 associated with a given resistive portion 31 and a resistance value set between the pair of terminal sections 42 associated with a given resistive portion 32 facing the given resistive portion 31 continuously varies in accordance with elastic deformation of the member 51 that is caused by a shear force. Based on such a difference between the resistance values, slip caused between the substrate 11 and a given contacted object can be detected.

The sum of the resistance value set between the pair of terminal sections 41 associated with a given resistive portion 31 and the resistance value set between the pair of terminal sections 42 associated with a given resistive portion 32 facing the given resistive portion 31 continuously varies in accordance with elastic deformation of the member 51 that is caused by a given shear force. Based on such a sum of the resistance values, the magnitude of a given force to press the substrate 11 by a given contacted object can be detected. Each component will be described below in detail.

The substrate 11 is an insulating member that is a base layer for forming the resistor 30 or the like and is flexible. The thickness of the substrate 11 is not particularly restricted, and can be appropriately selected for any purpose. For example, such a thickness can be approximately between 5 µm and 500 µm. In particular, when the thickness of the substrate 11 is between 5 µm and 200 µm, it is preferable in terms of reducing variations in strain sensitivity of the resistive portions 31.

The multiple resistive portions 31 are thin films of which the longitudinal direction of each is directed to the Y direction and that are juxtaposed in the X direction at predetermined intervals, on the lower surface 11b of the substrate 11 that is an insulating layer. Each resistive portion 31 is a sensitive section of which a resistance value varies in accordance with elastic deformation of the member 51. The resistive portions 32 may be formed directly on the lower surface 11b of the substrate 11, or may be formed above the lower surface 11b of the substrate 11 via another layer. Note that in FIG. 1, each resistive portion 31 is illustrated in a crepe pattern, for sake of convenience.

The substrate 12 is an insulating member that is a base layer for forming the resistive portions 32 or the like and is flexible. The thickness of the substrate 12 is not particularly restricted, and can be appropriately selected for any purpose. For example, such a thickness can be approximately between 5 µm and 500 µm. In particular, when the thickness of the substrate 12 is between 5 µm and 200 µm, it is preferable in terms of reducing variations in strain sensitivity of the resistive portions 33.

The multiple resistive portions 32 are thin films of which the longitudinal direction of each is directed to the Y direction and that are juxtaposed in the X direction at predetermined intervals, on the upper surface 12a of the substrate 12 that is an insulating layer, where the member 51 is provided between a given resistive portion 32 and a given resistive portion 31 facing the given resistive portion 32. Each resistive portion 32 is a sensitive section of which a resistance value varies in accordance with elastic deformation of the member 51. In this case, even if the member 51 elastically deforms due to a shear force, each resistive portion 32 is not deformed substantially and thus changes in a resistance value of the resistive portion 32 are negligible. The resistive portions 32 may be formed directly on the upper surface 12a of the substrate 12, or may be formed above the upper surface 12a of the substrate 12 via another layer.

Each of the substrates 11 and 12 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, or a polyolefin resin. Note that the film refers to a flexible member having a thickness of about 500 µm or less.

Here, the "formed of an insulating resin film" is not intended to preclude each of the substrates 11 and 12 from containing fillers, impurities, or the like in a given insulating resin film. Each of the substrates 11 and 12 may be formed of, for example, an insulating resin film containing fillers such as silica or alumina.

Each of the resistive portions 31 and 32 can be formed of, for example, material including Cr (chromium), material including Ni (nickel), or material including both of Cr and Ni. In other words, each of the resistive portions 31 and 32 can be formed of material including at least one among Cr and Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide.

The thickness of each of the resistive portions 31 and 32 is not particularly restricted, and can be appropriately selected for any purpose. The thickness can be, for example, approximately between 0.05 μm and 2 μm. In particular, when the thickness of each of the resistive portions 31 and the resistive portions 32 is 0.1 μm or more, it is preferable in terms of improvement in crystallinity (e.g., crystallinity of α-Cr) of a crystal that constitutes a given resistive portion among the resistive portions 31 and the resistive portions 32. When the thickness of each of the resistive portions 31 and the resistive portions 32 is 1 μm or less, it is further preferable in terms of reduction in cracks of a given film caused by internal stress of the film that constitutes a given resistive portion among the resistive portions 31 and 32, or reduction in warp in a given substrate among the substrate 11 and the substrate 12.

The width of each of the resistive portions 31 and 32 is not particularly restricted, and can be appropriately selected for any purpose. For example, the width can be approximately between 0.1 μm and 1000 μm (1 mm). A pitch between given resistive portions next to each other, among the resistive portions 31 and 32, is not particularly restricted, and can be appropriately selected for any purpose. For example, the pitch can be approximately between 1 mm and 100 mm. Note that in FIGS. 1 and 2, ten resistive portions 31 and ten resistive portions 32 are illustrated. However, in actuality, for each of the resistive portions 31 and 32, hundreds to thousands of resistive portions are provided approximately.

For example, when each of the resistive portions 31 and 32 is the Cr composite film, a given resistive portion is formed with α-Cr (alpha-chromium) as the main component having a stable crystalline phase, and thus stability of a temperature coefficient of each of the resistive portions 31 and 32, or improvement of sensitivity of each of the resistive portions 31 and 32 with respect to an applied press force can be achieved. Here, a main component means that a target substance is 50% by weight or more of total substances that constitute a given resistive portion. Each of the resistive portions 31 and 32 preferably includes α-Cr at 80% by weight or more, from the viewpoint of the stability of the temperature coefficient of a given resistive portion or improvement of sensitivity of a given resistive portion with respect to a slipping force. Note that α-Cr is Cr having a bcc structure (body-centered cubic structure).

On the lower surface 11b of the substrate 11, given terminal sections 41 respectively extend from both end portions of each resistive portion 31, and are each wider than the resistive portion 31 to be formed in an approximately rectangular shape, in a plan view. The terminal sections 41 are a pair of electrodes for externally outputting changes in a given resistance value of the resistive portion 31 in accordance with elastic deformation of the member 51, where, for example, a flexible substrate, a lead wire, or the like for an external connection is joined. The upper surface of each terminal section 41 may be coated with a metal allowing for greater solderability than the terminal section 41. Note that for the sake of convenience, the resistive portions 31 and the terminal sections 41 are expressed by different numerals. However, a given resistive portion 31 and given terminal sections 41 can be integrally formed of the same material, in the same process.

On the upper surface 12a of the substrate 12, given terminal sections 42 respectively extend from both end portions of each resistive portion 32, and are each wider than the resistive portion 32 to be formed in an approximately rectangular shape, in a plan view. The terminal sections 42 are a pair of electrodes for externally outputting changes in a given resistance value of the resistive portion 32, where, for example, a flexible substrate, a lead wire, or the like for external connection is joined. The upper surface of each terminal section 42 may be coated with a metal allowing for greater solderability than the terminal section 42. Note that for the sake of convenience, the resistive portions 32 and the terminal sections 42 are expressed by different numerals. However, a given resistive portion 32 and given terminal sections 42 can be integrally formed of the same material, in the same process.

Note that through interconnects (through holes) are provided through a given substrate among the substrate 11 and the substrate 12, and the terminal sections 41 and 42 may be collected on the upper surface 11a side of the substrate 11 or the lower surface 12b side of the substrate 12.

A cover layer (insulating resin layer) may be disposed on and above the lower surface 11b of the substrate 11, such that the resistive portions 31 are coated and the terminal sections 41 are exposed. A cover layer (insulating resin layer) may be also disposed on and above the upper surface 12a of the substrate 12, such that the resistive portions 32 are coated and the terminal sections 42 are exposed. By providing the cover layers, mechanical damage and the like can be prevented from occurring in the resistive portions 31 and 32. Further, by providing the cover layers, the resistive portions 31 and 32 can be protected against moisture and the like. Note that one or more cover layers may be provided to cover all portions except for the terminal sections 41 and 42.

The cover layer can be formed of an insulating resin such as a PI resin, an epoxy resin, a PEEK resin, a PEN resin, a PET resin, a PPS resin, or a composite resin (e.g., a silicone resin or a polyolefin resin). The cover layer may contain fillers or pigments. The thickness of the cover layer is not particularly restricted, and can be appropriately selected for any purpose. For example, the thickness can be approximately between 2 μm and 30 μm.

The member 51 is provided between the lower surface 11b side of the substrate 11 and the upper surface 12a side of the substrate 12. The member 51 is a member that deforms in accordance with a force from a contacted object when the force is applied to the substrate 11 from the contacted object. Examples of the material of the member 51 include silicon rubber, acrylic rubber, urethane rubber, and the like. The thickness of the member 51 is not particularly restricted and can be appropriately selected for any purpose. For example, such a thickness can be approximately between 5 μm and 50 μm.

In order to manufacture the slip sensor 1, first, the substrate 11 is prepared and the resistive portions 31 and the terminal sections 41 each of which has the planar shape illustrated in FIG. 1 are formed on the lower surface 11b of the substrate 11. The material and thickness for each of the resistive portions 31 and the terminal sections 41 are the same as the material and thickness described above. The resistive portions 31 and the terminal sections 41 can be integrally formed of the same material.

The resistive portions 31 and the terminal sections 41 can be formed, for example, such that a raw material capable of forming the resistive portions 31 and the terminal sections 41 is a target to be deposited by magnetron sputtering, and such that patterning is performed by photolithography. Instead of magnetron sputtering, the resistive portions 31 and the terminal sections 41 may be deposited by reactive sputtering, vapor deposition, arc ion plating, pulsed laser deposition, or the like.

From the viewpoint of achieving the stability of the temperature coefficient of each resistive portion 31 and improvement of sensitivity of the resistive portion 31 with respect to an applied force, before depositing the resistive portions 31 and the terminal sections 41, preferably, as a base layer, a functional layer having a film thickness that is approximately between 1 nm and 100 nm is vacuum-deposited. The functional layer can be deposited by conventional sputtering, for example. Note that, after forming the resistive portions 31 and the terminal sections 41 on the entire upper surface of the functional layer, the functional layer, as well as the resistive portions 31 and the terminal sections 41, are patterned in the planar shape illustrated in FIG. 1, by photolithography.

In the present application, the functional layer refers to a layer that has a function of promoting crystal growth of the resistive portions that are at least an upper layer. The functional layer preferably further has a function of preventing oxidation of the resistive portions caused by oxygen and moisture included in the substrate 11, as well as a function of improving adhesion between the substrate 11 and each resistive portion. The functional layer may further have other functions.

The insulating resin film constituting the substrate 11 contains oxygen and moisture. In this regard, particularly when each resistive portion includes Cr, it is effective for the functional layer to have a function of preventing oxidation of the resistive portion, because Cr forms an autoxidized film.

The material of the functional layer is not particularly restricted as long as it is material having a function of promoting crystal growth of the resistive portions that are at least an upper layer. Such material can be appropriately selected for any purpose, and includes one or more metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals among the group; or a compound of any metal among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and an Ar (argon) gas is supplied to a chamber. With use of conventional sputtering, the functional layer is deposited while the lower surface 11b of the substrate 11 is etched with Ar. Thus, a deposited amount of a film of the functional layer is minimized and thus the effect of improving adhesion can be obtained.

However, this is an example of a method of depositing the functional layer, and the functional layer may be formed by other methods. For example, as such a method, before depositing the functional layer, the lower surface 11b of the substrate 11 is activated by plasma treatment such as plasma treatment using Ar or the like, to thereby obtain the effect of improving the adhesion. Subsequently, the functional layer may be vacuum-deposited by magnetron sputtering.

A combination of the material of the functional layer, and the material of the resistive portions 31 and the terminal sections 41 is not particularly restricted, and can be appropriately selected for any purpose. For example, Ti is used for the functional layer, and a Cr composite film formed with α-Cr (alpha-chromium) as the main component can be deposited as the resistive portions 31 and the terminal sections 41.

In this case, each of the resistive portions 31 and the terminal sections 41 can be deposited by, for example, magnetron sputtering in which a raw material capable of forming the Cr composite film is the target and an Ar gas is supplied to a chamber. Alternatively, the resistive portions 31 and the terminal sections 41 may be deposited by reactive sputtering in which pure Cr is the target and an appropriate amount of nitrogen gas, as well as an Ar gas, are supplied to a chamber.

In such methods, a growth surface of the Cr composite film is defined by the functional layer formed of Ti, and a Cr composite film that is formed with α-Cr as the main component having a stable crystalline structure can be deposited. Also, Ti that constitutes the functional layer is diffused into the Cr composite film, so that stability of the temperature coefficient of each resistive portion 31 and improvement of sensitivity of the resistive portion 31 with respect to a given applied force can be achieved. Note that, when the functional layer is formed of Ti, the Cr composite film may include Ti or titanium nitride (TiN).

Note that when each resistive portion 31 is a Cr composite film, the functional layer formed of Ti includes all functions of a function of promoting crystal growth of the resistive portions 31, a function of preventing oxidation of the resistive portions 31 caused by oxygen or moisture contained in the substrate 11, and a function of improving adhesion between the substrate 11 and each resistive portion 31. Instead of Ti, when the functional layer is formed of Ta, Si, Al, or Fe, the functional layer also includes the same functions.

As described above, by providing the functional layer in the lower layer of the resistive portions 31, crystal growth of the resistive portions 31 can be promoted and thus the resistive portions 31 each having a stable crystalline phase can be fabricated. As a result, in the slip sensor 1, stability of the temperature coefficient of each resistive portion 31 and improvement of sensitivity of each resistive portion 31 with respect to an applied force can be achieved.

Next, the substrate 12 is prepared and the resistive portions 32 and the terminal sections 42 are formed on the upper surface 12a of the substrate 12. The resistive portions 32 and the terminal sections 42 can be formed in the same method as the resistive portions 31 and the terminal sections 41. In this case as well, a functional layer is preferably vacuum-deposited as a base layer, before depositing the resistive portions 32 and the terminal sections 42, as in the resistive portions 31 and the terminal sections 41.

After forming the resistive portions 31 and the terminal sections 41, and the resistive portions 32 and the terminal sections 42, a given cover layer with which the resistive portions 31 are coated and that exposes the terminal sections 41 may be provided on and above the lower surface 11b of the substrate 11. Further, a given cover layer with which the resistive portions 32 are coated and that exposes the terminal sections 42 may be provided on and above the upper surface 12a of the substrate 12.

A given cover layer can be fabricated, such that a thermosetting insulating resin film in a semi-cured state is laminated on the lower surface 11b of the substrate 11, and such that the resistive portions 31 are coated therewith and the terminal sections 41 are exposed and subsequently, heat is added and curing is performed. Further, a given cover layer can be fabricated, such that a thermosetting insulating resin film in a semi-cured state is laminated on the upper surface 12*a* of the substrate 12, and such that the resistive portions 32 are coated therewith and the terminal sections 42 are exposed and subsequently, heat is added and curing is performed. Instead of use of a laminated insulating resin film, a given cover layer may be formed such that a thermosetting insulating resin that is liquid or paste-like is applied and subsequently, heat is added and curing is performed.

Next, the member 51 capable of elastically deforming is prepared. The substrate 12 with the resistive portions 32 is located underneath the member 51 such that the resistive portions 32 are faced upwards, and the substrate 11 with the resistive portions 31 is located on the member 51 such that the resistive portions 31 are faced downwards. Then, each of the substrates 11 and 12 is attached to the member 51. In such a manner, the slip sensor 1 is completed.

For example, each of the substrates 11 and 12 can be attached to the member 51 via a given adhesive layer. The adhesive layer is not particularly restricted and can be appropriately selected for any purpose. For example, an epoxy resin, a modified epoxy resin, a silicon resin, a modified silicon resin, a urethane resin, a modified urethane resin, or the like can be used as the adhesive layer.

Figure 3:
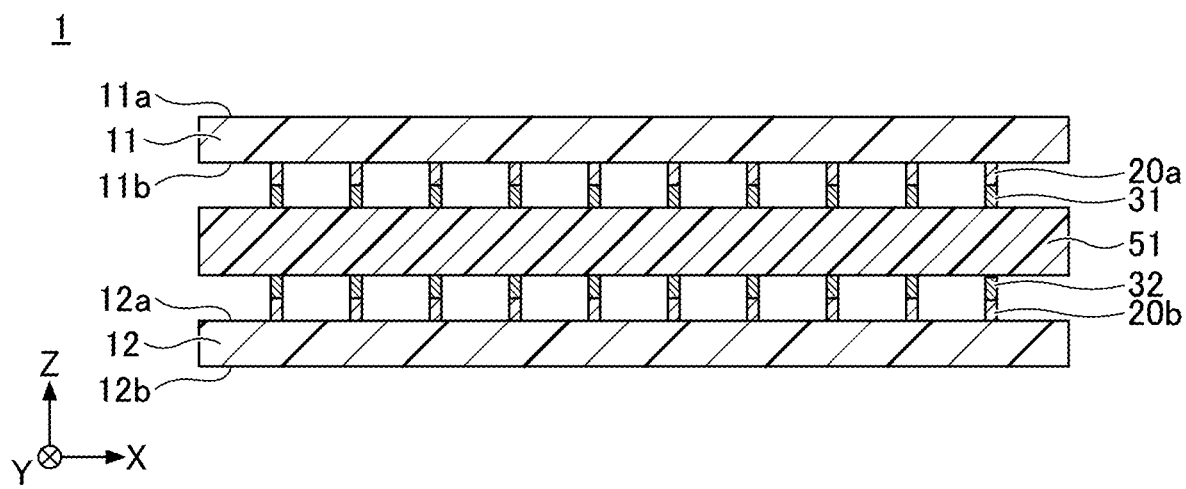
FIG. 3 is a cross-sectional view (second part) illustrating an example of the slip sensor according to the first embodiment.

Note that when a given functional layer as a base layer of the resistive portions 31 and the terminal sections 41 is provided on the lower surface 11*b* of the substrate 11, and a given functional layer as a base layer of the resistive portions 32 and the terminal sections 42 is provided on the upper surface 12*a* of the substrate 12, the slip sensor 1 has the cross-sectional shape illustrated in FIG. 3. Layers expressed by the numerals 20*a* and 20*b* indicate the respective functional layers. The planar shape of the slip sensor 1 in the case of providing the functional layers 20*a* and 20*b* is the same as that illustrated in FIG. 1.

Figure 4:
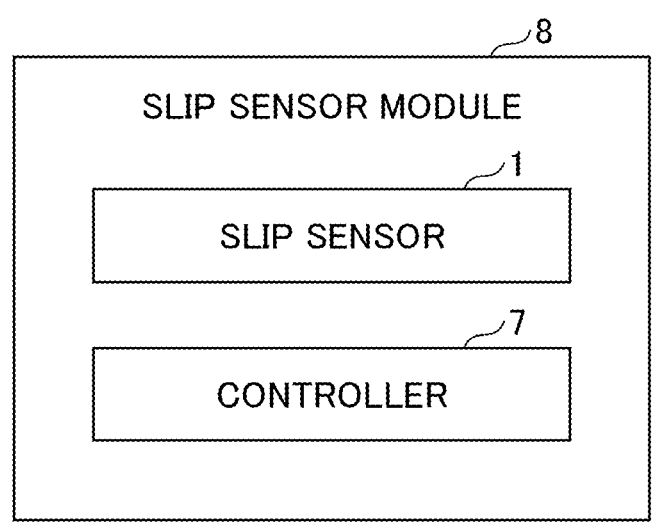
FIG. 4 is a block diagram illustrating an example of a slip sensor module according to the first embodiment.

As illustrated in FIG. 4, the slip sensor module 8 can be implemented by the slip sensor 1 and the controller 7. In the slip sensor module 8, the slip sensor 1 is attached to, for example, a person's finger or a finger in a robot hand, in a case or the like where a person or a robot grasps an object, a contacted location of the object, or slip can be detected by the controller 7. Multiple slip sensors 1 may be attached to respective fingers in the robot hand. For example, when multiple slip sensors 1 may be attached to person's fingers or fingers in the robot hand. For example, when slip sensors 1 are respectively attached to two fingers in a given robot hand, and then an object is grasped with the two fingers in the robot hand, locations in contact with the object, or slip can be detected by the controller 7, based on the outputs of the respective slip sensors 1.

In the slip sensor module 8, the terminal sections 41 and 42 of the slip sensor 1 in the slip sensor 1 are each connected to the controller 7, by using, for example, a flexible substrate, a lead wire, or the like.

Based on information obtained through given terminal sections 41 and 42 of the slip sensor 1, the controller 7 can detect coordinates of a given location of the slip sensor 1 contacting an object to be contacted, as well as slip of the contacted objected. For example, each of the resistive portions 31 and 32 of the slip sensor 1 can be used to perform detection with respect to an X-coordinate.

Figure 5:
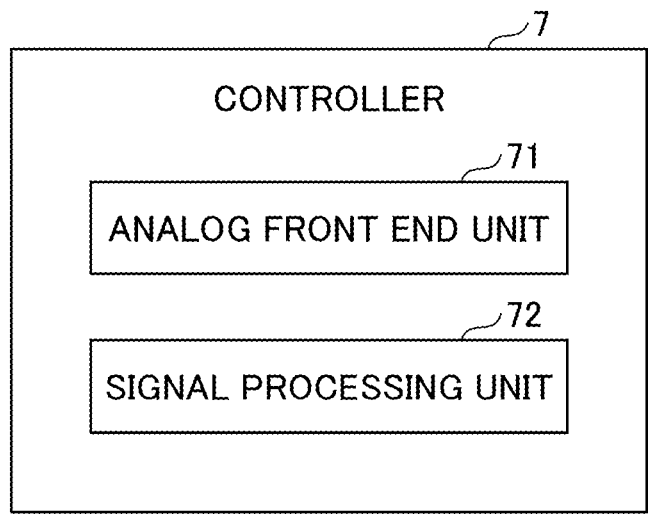
FIG. 5 is a block diagram illustrating an example of a controller of the slip sensor module according to the first embodiment.

As illustrated in FIG. 5, for example, the controller 7 can include an analog front end unit 71 and a signal processing unit 72.

The analog front end unit 71 includes, for example, an input signal selection switch, a bridge circuit, an amplifier, an analog-to-digital conversion circuit (A/D conversion circuit), and the like. The analog front end unit 71 may include a temperature compensation circuit.

In the analog front end unit 71, for example, all of the terminal sections 41 and 42 of the slip sensor 1 are connected to the input signal selection switch, and a pair of electrodes is selected by the input signal selection switch. A given pair of electrodes selected by the input signal selection switch is connected to the bridge circuit.

In such a case, one side of the bridge circuit is comprised of a given resistive portion between a given pair of electrodes selected by the input signal selection switch, and the other three sides are each comprised of fixed resistance. With such a configuration, as the output of the bridge circuit, a voltage (analog signal) corresponding to a resistance value of the resistive portion between a given pair of electrodes selected by the input signal selection switch can be obtained. Note that the input signal selection switch is configured to be able to be controlled by the signal processing unit 72.

An output voltage of the bridge circuit is amplified by the amplifier and then is converted to a digital signal by the A/D conversion circuit. The digital signal is transmitted to the signal processing unit 72. When the analog front end unit 71 includes a temperature compensation circuit, a digital signal for which temperature compensation is performed is transmitted to the signal processing unit 72. By performing switching through the input signal selection switch at high speed, digital signals corresponding to resistance values associated with all of the terminal sections 41 and 42 of the slip sensor 1 can be transmitted to the signal processing unit 72 in an extremely short amount of time.

Based on information transmitted from the analog front end unit 71, the signal processing unit 72 can detect one or more coordinates of locations at which the slip sensor 1 contacts a given object to be contacted, as well as detecting slip of the contacted object. Specifically, the signal processing unit 72 calculates a difference in the resistance value between a given resistive portion 31 and given resistive portion 32 that are opposed to each other, to thereby be able to detect slip of a contacted object. The signal processing unit 72 also calculates the sum of resistance values for a given resistive portion 31 and given resistive portion 32 that are opposed to each other, to thereby be able to calculate, when a contacted object presses the slip sensor 1, the magnitude of a given force to press the slip sensor 1.

The signal processing unit 72 can include, for example, a central processing unit (CPU), a read only memory (ROM), a random access memory (RAM), a main memory, and the like.

In this case, various functions of the signal processing unit 72 can be implemented by executing a program stored in the ROM or the like, where the program is read out to the main memory and is executed by the CPU. However, a portion or all of the signal processing unit 72 may be implemented by hardware only. The signal processing unit 72 may be also configured physically by a plurality of devices or the like.

Figure 6:
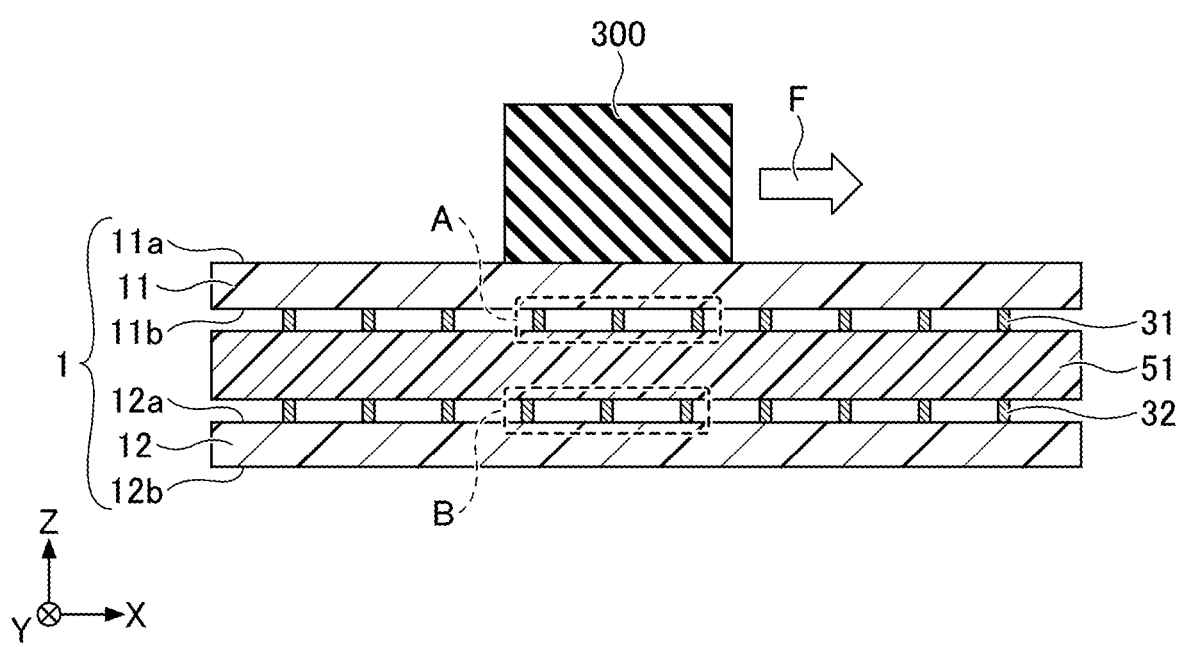
FIG. 6 is a cross-sectional view schematically illustrating the slip sensor in a manner of contacting an object.

FIG. 6 is a cross-sectional view schematically illustrating the slip sensor in a manner of contacting a given object. As illustrated in FIG. 6, in a state where the slip sensor 1 is in contact with an object 300 to be contacted, when a force F (shear force) is applied in the direction represented by the arrow, a substrate 11-side of the member 51 proximal to an applied location of the force F is deformed in the direction of the force F. In contrast, a substrate 12-side of the member 51 is not deformed substantially.

In other words, the resistance value of each resistive portion 31 located in a region A changes, while the resistance value of each resistive portion 32 located in a region B does not change substantially. Note that in a state where the force F is yet to be applied, a given resistive portion 31 located in the region A and a given resisting portion 32 located in the region B are disposed facing each other, where the member 51 is provided between the given resistive portion 31 and the given resistive portion 32.

By calculating the difference in the resistance value between a given resistive portion 31 and given resistive portion 32 that are opposed to each other, slip of the contacted object 300 can be calculated. For example, a difference in the resistance value between a left-side resistive portion 31 in the region A and a left-side resistive portion 32 in the region B, a difference in the resistance value between a middle resistive portion in the region A and a middle resistive portion in the region B, and a difference in the resistance value between a right-side resistive portion 31 in the region A and a right-side resistive portion 32 in the region B, are calculated. In such a manner, the magnitude and distribution of slip can be identified.

In such a manner, the difference in the resistance value between a given resistive portion 31 and a given resistive portion 32 is obtained in order to remove a component caused by pressing the slip sensor 1 in a thickness direction (Z direction). In other words, when the slip sensor 1 is pressed in the thickness direction, the given resistive portion 31 and given resistive portion 32 are pressed and distorted in the same manner, and thus with respect to the same direction, each of the resistance value of the given resistance portion 31 and the resistance value of the given resistance portion 32 changes to the same extent. Therefore, a component of a given pressing force can be removed in light of the obtained difference in the resistance value between the given resistance portion 31 and given resistance portion 32. As a result, a slip component can be accurately detected.

Note that in addition to the slip component, if it is required to calculate the component of the pressing force, the sum of resistance values for a given resistive portion 31 and given resistive portion 32 that are opposed to each other is calculated and thereby the component of the pressing force through the contacted object 300 can be calculated. In other words, the slip sensor 1 can also serve as a tactile sensor.

As described above, when a given force from the contacted object is applied to the slip sensor 1, the member 51 elastically deforms in accordance with the force from the contacted object. When the member 51 is elastically deformed, the difference between the resistance value set between given terminal sections 41, which are a pair of electrodes associated with a given resistive portion 31, and the resistance value set between given terminal sections 42, which are the pair of electrodes associated with a given resistive portion 32 facing the given resistive portion 31, continuously varies in accordance with elastic deformation of the member 51 due to a given shear force, where the member 51 is provided between the given resistive portion 31 and the given resistive portion 32. Based on variations in the difference between the resistance values, slip occurring between the slip sensor 1 and a given contacted object can be detected. By obtaining the difference in the resistance value between a given resistive portion 31 and a given resistive portion 32, the difference in the resistance value between the given resistive portions 31 and 32 due to the elastic deformation of the member 51 that occurs in accordance with a compressive force, can be eliminated. Accordingly, slip occurring between the slip sensor 1 and the contacted object can be detected with high accuracy.

In particular, when the resistive portions 31 and 32 are each formed of a Cr composite film, sensitivity of a resistance value with respect to a force (a change amount of the resistance value for each of the resistive portions 31 and 32 with respect to the same force) is significantly improved in comparison to a case where the resistive portions 31 and 32 are each formed of Cu—Ni or Ni—Cr. When the resistive portions 31 and 32 are each formed of the Cr composite film, sensitivity of the resistance value with respect to the force is about 5 to 10 times greater than that in the case where the resistive portions 31 and 32 are each formed of Cu—Ni or Ni—Cr. For this reason, by forming each of the resistive portions 31 and 32 of a Cr composite film, slip occurring between the slip sensor 1 and a given contacted object can be particularly detected with high sensitivity.

If high sensitivity of the resistance value with respect to a given force is set, a control can be achieved such that, a predetermined operation is performed when it is detected that slip is at a short level, another operation is performed when it is detected that slip is at a middle level, and still another operation is performed when it is detected that slip is at a long level. Alternatively, a control can be achieved such that, no operation is performed when it is detected that slip is at a short or middle level, and a predetermined operation is performed only when it is detected that slip is at a long level.

When high sensitivity of the resistance value with respect to a given force is set, a signal with high S/N can be obtained. Thus, signal detection can be performed accurately even if the number of times the A/D conversion circuit of the analog front end unit 71 performs averaging is reduced. By reducing the number of times the A/D conversion circuit performs averaging, a time required for one A/D conversion can be decreased, so that the input signal selection switch can perform switching at a higher speed. As a result, a fast movement transferred to the slip sensor 1 can also be detected.

Moreover, in particular, when the resistive portions 31 and 32 are each formed of a Cr composite film, the size of each of the resistive portions 31 and 32 can be reduced to be a tenth or less in a plan view, in comparison to a case where each of the resistive portions 31 and 32 are formed of Cu—Ni or Ni—Cr. As a result, a smaller sized slip sensor 1 can be implemented and thus the slip sensor 1 can be mounted on various objects.

First Modification of the First Embodiment

The first modification of the first embodiment provides an example of the slip sensor in which a given member capable of elastically deforming is likely to be deformable in a specific direction. Note that in the first modification of the first embodiment, description for the same components as those in the embodiment described previously may be omitted.

Figure 7:
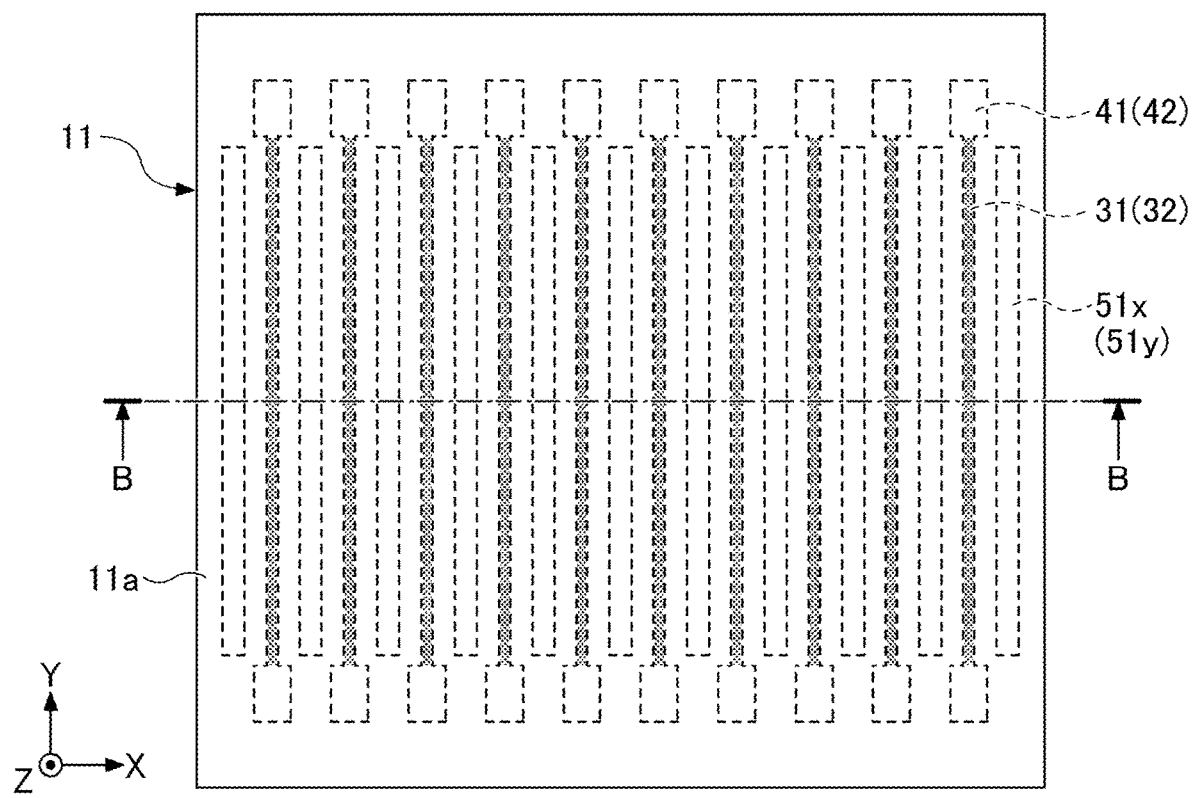
FIG. 7 is a plan view (first part) illustrating an example of a slip sensor according to a first modification of the first embodiment.
Figure 8:
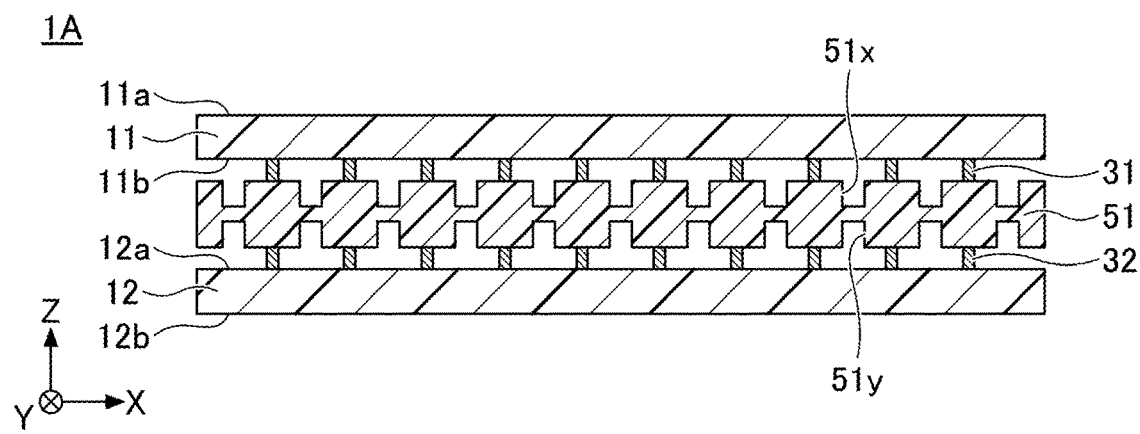
FIG. 8 is a cross-sectional view (first part) illustrating an example of the slip sensor according to the first modification of the first embodiment.

FIG. 7 is a plan view illustrating an example of the slip sensor according to the first modification of the first embodiment. FIG. 8 is a cross-sectional view illustrating an example of the slip sensor according to the first modification of the first embodiment, and illustrates the cross section taken along the B-B line in FIG. 7.

Referring to FIGS. 7 and 8, in a slip sensor 1A, recessed portions 51x to recess the substrate 11-side surface of the member 51 toward the substrate 12-side surface of the member 51 are respectively provided in regions of the member 51 on both sides of a given resistive portion among the resistive portions 31. In a plan view, each recessed portion 51x is provided along the longitudinal direction (Y direction) of a given resistive portion 31. Also, recessed portions 51y to recess the substrate 12-side surface of the member 51 toward the substrate 11-side surface of the member 51 are respectively provided in regions of the member 51 on both sides of a given resistive portion 32 among the resistive portions 32. In a plan view, each recessed portion 51y is provided along the longitudinal direction (Y direction) of a given resistive portion 32.

As described above, in the slip sensor 1A, the recessed portions 51x are respectively provided in the areas located on both sides of a given resistive portion 31, and the recessed portions 51y are respectively provided in the areas located on both sides of a given resistive portion 32. In such a manner, when a given force is applied to the slip sensor 1A, an amount of deformation of the member 51 in the X direction is increased. As a result, sensitivity of the slip sensor 1A for detecting slip in the X direction can be improved.

Figure 9:
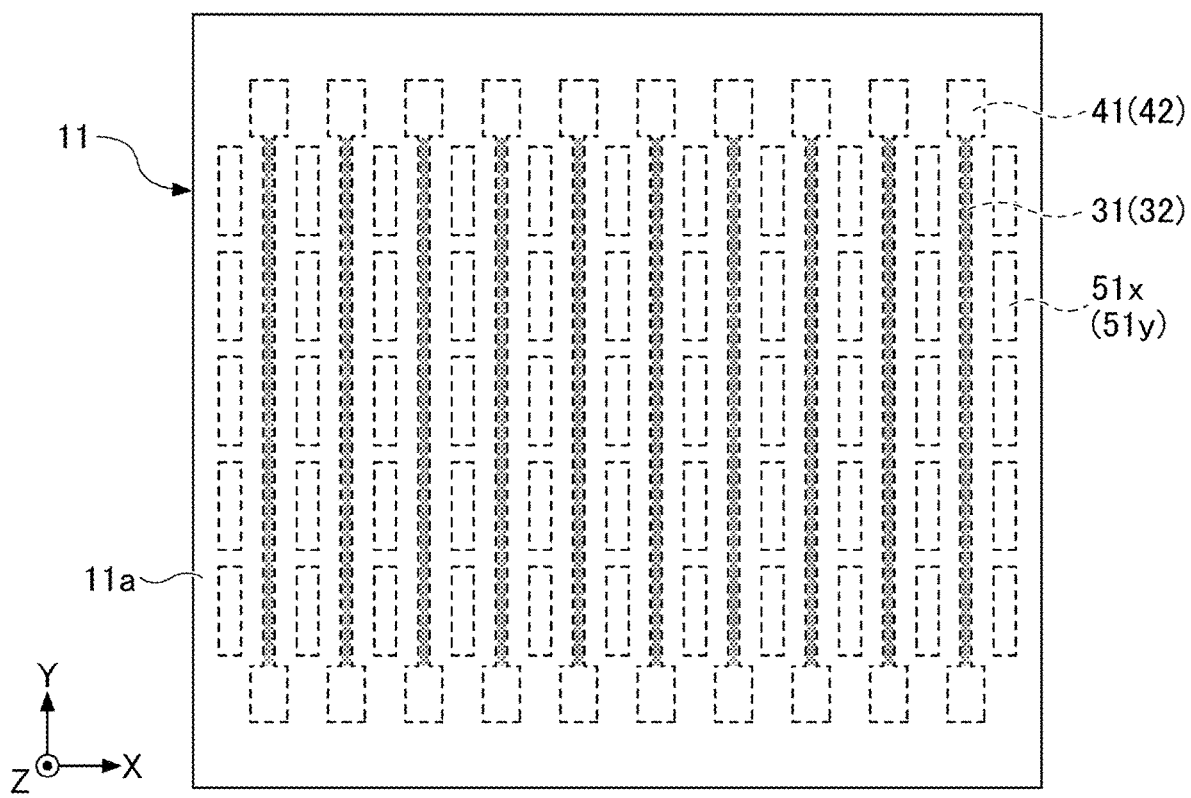
FIG. 9 is a plan view (second part) illustrating an example of the slip sensor according to the first modification of the first embodiment.

Note that as in the slip sensor 1B illustrated in the plan view in FIG. 9, for each of the recessed portions 51x and 51y, multiple recessed portions may be intermittently disposed with respect to a length of either one resistive portion 31 or one resistive portion 32.

Figure 10:
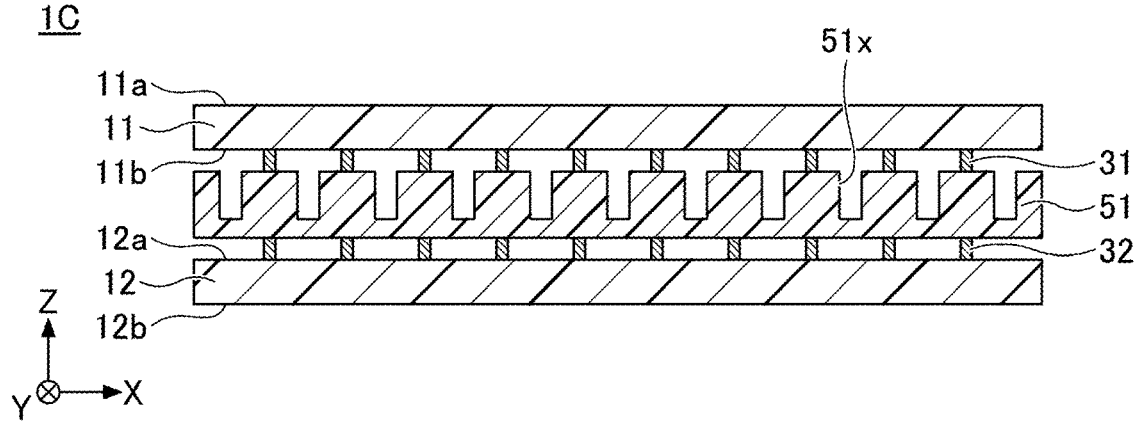
FIG. 10 is a cross-sectional view (second part) illustrating an example of the slip sensor according to the first modification of the first embodiment.

Further, as in the slip sensor 1C illustrated in the cross-sectional view in FIG. 10, only recessed portions 51x may be provided without providing any recessed portion 51y. In this case, a depth of each recessed portion 51x may be half or more than half a thickness of the member 51. Further, in a plan view, one recessed portion 51x may be also disposed with respect to a length of one resistive portion 31, as illustrated in FIG. 7, or multiple recessed portions 51x may be intermittently disposed with respect to the length of one resistive portion 31, as illustrated in FIG. 9.

Also, in any one of the cases illustrated in FIGS. 7 to 10, through-holes may be used instead of the recessed portions.

For each of the slip sensor 1B illustrated in FIG. 9 and the slip sensor 1C illustrated in FIG. 10, sensitivity for detecting slip in the X direction can be also improved, as in the slip sensor 1A illustrated in FIG. 7 and FIG. 8.

Second Modification of the First Embodiment

The second modification of the first embodiment provides an example of a slip sensor capable of detecting XY coordinates. Note that in the second modification of the first embodiment, description for the same components as those in the embodiments described previously may be omitted.

Figure 11:
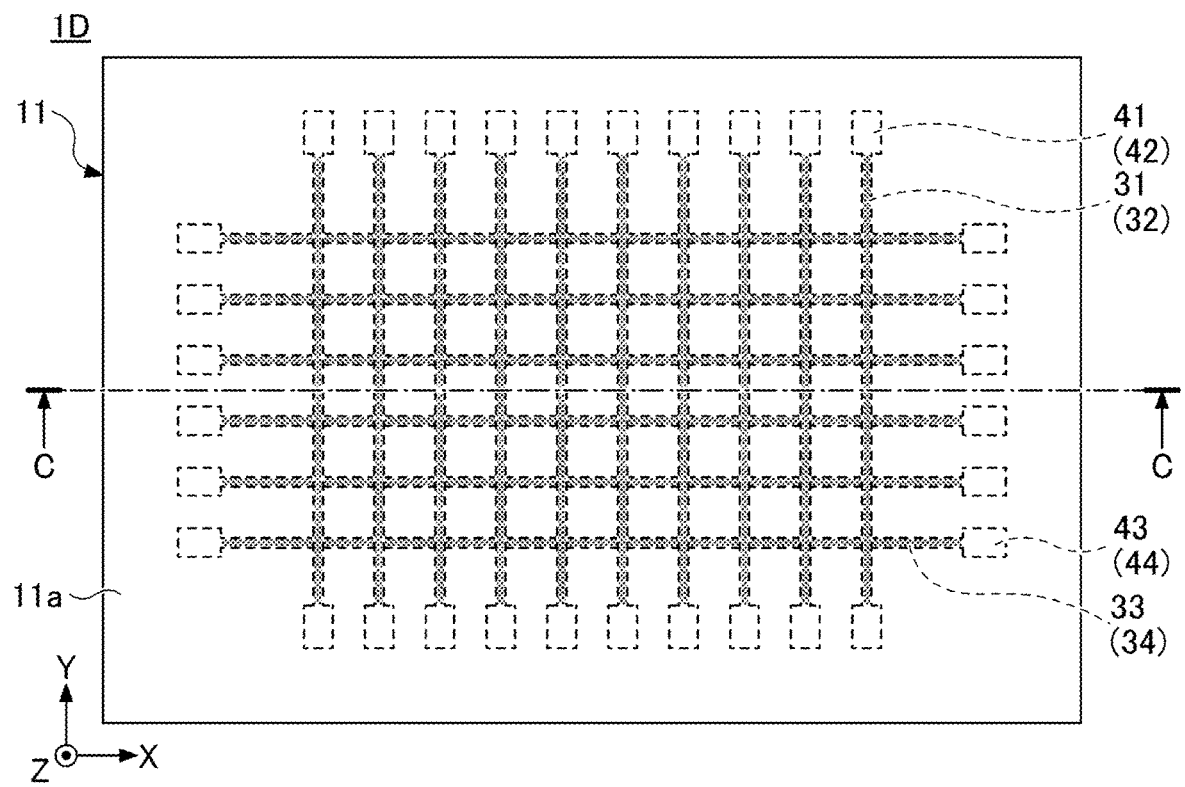
FIG. 11 is a plan view illustrating an example of the slip sensor according to a second modification of the first embodiment.
Figure 12:
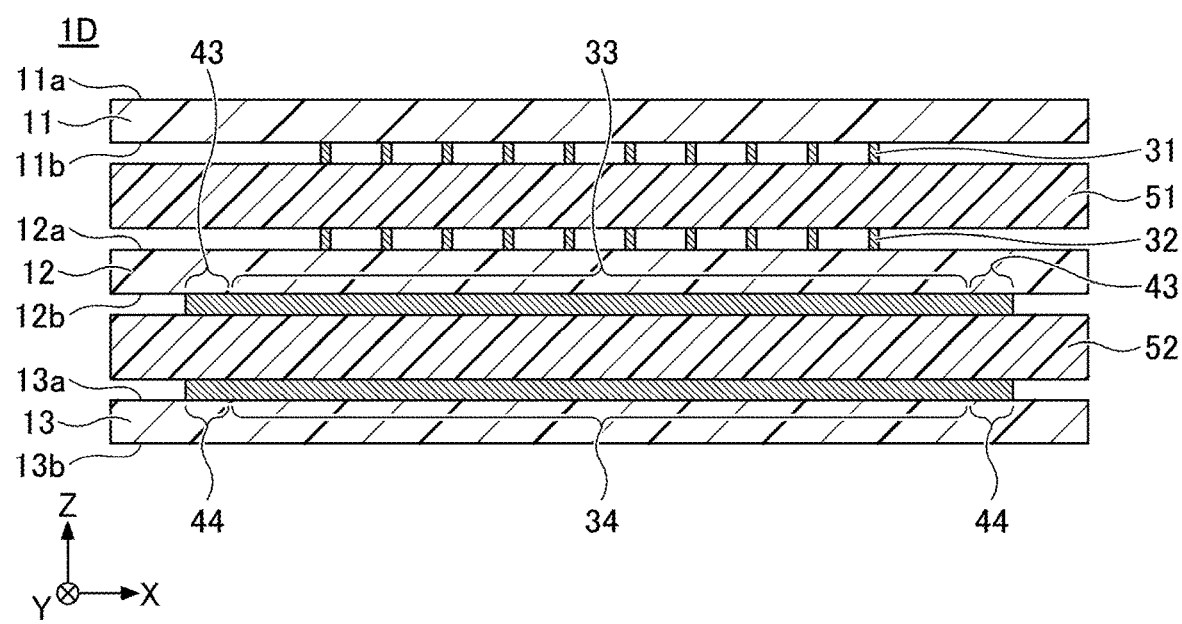
FIG. 12 is a cross-sectional view illustrating an example of the slip sensor according to the second modification of the first embodiment.

FIG. 11 is a plan view of a slip sensor according to the second modification of the first embodiment. FIG. 12 is a cross-sectional view of the slip sensor according to the second modification of the first embodiment, and illustrates the cross section taken along the C-C line in FIG. 11.

Referring to FIG. 11 and FIG. 12, a slip sensor 1D has the structure of the slip sensor 1, and further, multiple resistive portions 33 of which the longitudinal direction of each is directed to the X direction and that are juxtaposed in the Y direction at predetermined intervals are formed on the lower surface 12b of the substrate 12. The slip sensor 1D also includes a substrate 13 and an elastically deformable member 52, where resistive portions 34 of which the longitudinal direction of each is directed to the X direction and that are juxtaposed in the Y direction at predetermined intervals are formed on the upper surface 13a of the substrate 13. The member 52 is laminated between the lower surface 11b of the substrate 12 and the upper surface 13a of the substrate 13.

Each resistive portion 33 is disposed facing a given resistive portion 34, where the member 52 is provided between a given resistive portion 33 and the given resistive portion 34. Terminal sections 43 that are a pair of electrodes are provided on both end portions of each resistive portion 33, and terminal sections 44 that are a pair of electrodes are provided on both end portions of each resistive portion 34.

A difference between a resistance value set between given terminal sections 43, which are a pair of electrodes associated with a given resistive portion 33, and a resistance value set between given terminal sections 44, which are a pair of electrodes associated with a given resistive portion 34 facing the given resistive portion 33, continuously varies in accordance with elastic deformation of the member 51 due to a given shear force. Based on variations in the difference between the resistance values, slip occurring between the substrate 11 and a given contacted object can be detected.

The sum of the resistance value set between the pair of terminal sections 43 associated with a given resistive portion 33 and the resistance value set between the pair of terminal sections 44 associated with a given resistive portion 34 facing the given resistive portion 33 continuously varies in accordance with elastic deformation of the member 52 due to a given compressive force. Based on variations in the sum of the resistance values, the magnitude of a given, force to press the substrate 11 by a contacted object can be detected.

The materials, thicknesses, and manufacturing method of the resistive portions 33 and 34 can be the same as the materials, thicknesses, and manufacturing method of the resistive portions 31 and 32. The material and thickness of the member 52 can be the same as the material and thickness of the member 51. Note that a given resistive portion 31 and a given resistive portion 33 may intersect while not being required to be perpendicular to each other in a plan view, and a given resistive portion 32 and a given resistive portion 34 may intersect while not being required to be perpendicular to each other in a plan view.

As described above, in the slip sensor 1D, in addition to the resistive portions 31 and 32 of which the longitudinal direction of each is directed to the Y direction, the resistive portions 33 and 34 of which the longitudinal direction of each is directed to the X direction are provided. In such a manner, the slip sensor 1D can calculate slip in the X direction based on the difference in the resistance value between a given resistive portion 31 and given resistive portion 32 that are opposed to each other. Further, the slip sensor 1D can calculate slip in the Y direction based on the difference in the resistance value between a given resistive portion 33 and given resistive portion 34 that are opposed to each other. Further, XY coordinates of a given location where slip occurs can be also calculated.

Note that one or more recessed portions, as illustrated in each of FIGS. 7 to 10, may be provided along a given resistive portion among the resistive portions 31 and 32 provided on or above the member 51. Likewise, one or more recessed portions, as illustrated in each of FIGS. 7 to 10, may be provided along a given resistive portion among the resistive portions 33 and 34 provided on or above the member 52. In such a manner, in the slip sensor 1D, sensitivity for detecting slip in the X direction, as well as sensitivity for detecting slip in the Y direction, can be improved.

Third Modification of the First Embodiment

The third modification of the first embodiment provides another example of a slip sensor capable of detecting XY coordinates. Note that in the third modification of the first embodiment, description for the same components as those in the embodiments described previously may be omitted.

Figure 13:
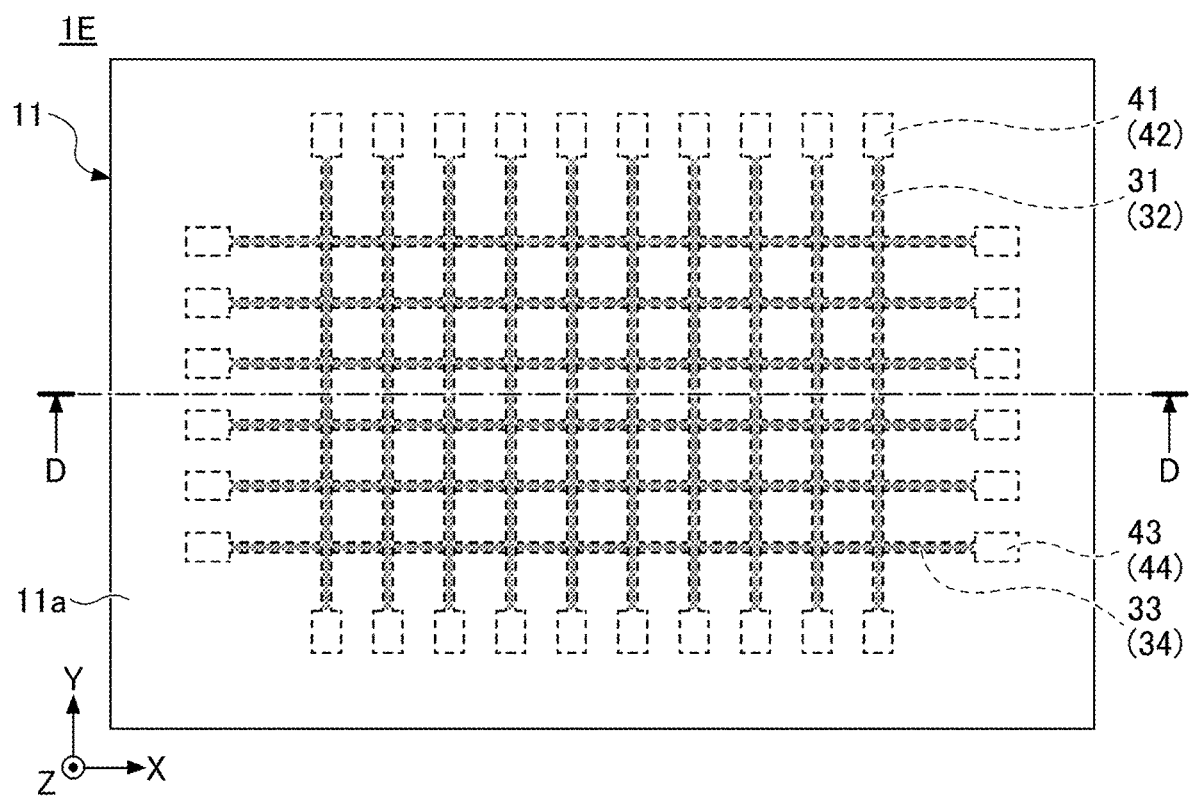
FIG. 13 is a plan view (first part) illustrating an example of a slip sensor according to a third modification of the first embodiment.
Figure 14:
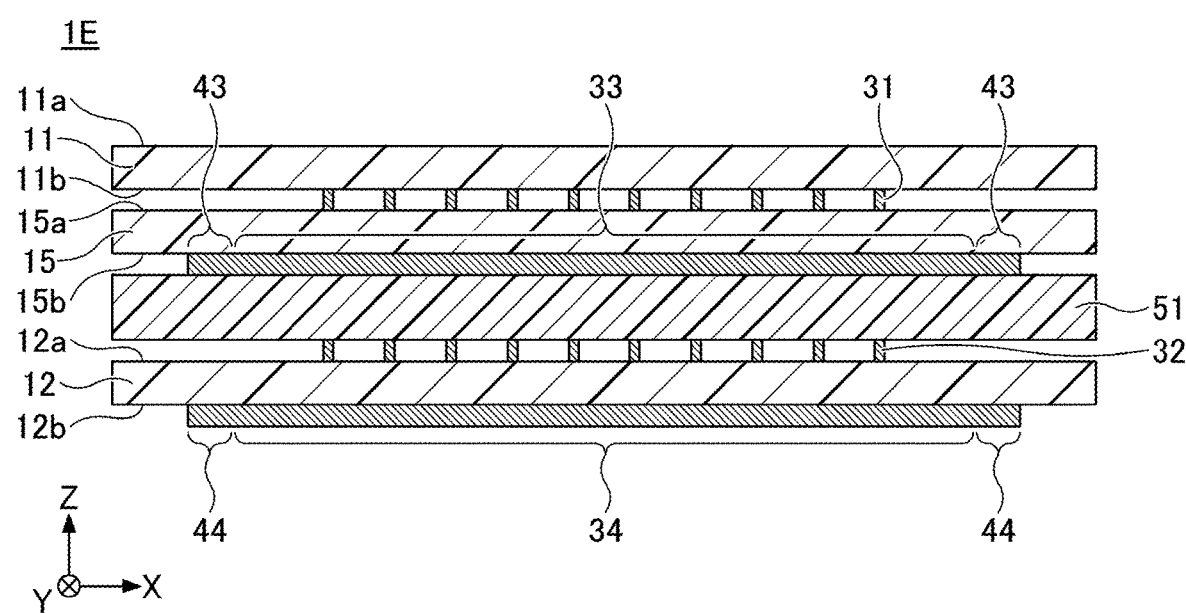
FIG. 14 is a cross-sectional view illustrating an example of the slip sensor according to the third modification of the first embodiment.

FIG. 13 is a plan view of the slip sensor according to the third modification of the first embodiment. FIG. 14 is a cross-sectional view of the slip sensor according to the third modification of the first embodiment, and illustrates the cross section taken along the D-D line in FIG. 13.

Referring to FIGS. 13 and 14, a slip sensor 1E has the structure of the slip sensor 1, and further includes a substrate 15 that is an insulating layer with multiple resistive portions 33 provided between the substrate 11 and the member 51. Further, multiple resistive portions 34 are provided on the lower surface 12b of the substrate 12. For example, the material and thickness of the substrate 15 can be the same as the material and thickness of the substrate 11.

The multiple resistive portions 33 of which the longitudinal direction of each is directed to the X direction are juxtaposed in the Y direction at predetermined intervals, on the lower surface 15b of the substrate 15. Terminal sections 43 that are a pair of electrodes are provided on both end portions of each resistive portion 33.

The upper surface 15a of the substrate 15 is disposed below the lower surface 11b of the substrate 11 via the resistive portions 31. The member 51 is disposed between the lower surface 15b of the substrate 15 and the upper surface 12a of the substrate 12.

The multiple resistive portions 34 of which the longitudinal direction of each is directed to the X direction are juxtaposed in the Y direction at predetermined intervals, on the lower surface 12b of the substrate 12. Terminal sections 44 that are a pair of electrodes are provided on both end portions of each resistive portion 34. Each of the resistive portions 34 is disposed facing a given resistive portion 33, and the substrate 12 and the member 51 are disposed between the given resistive portion 33 and a given resistive portion 34.

A difference between a resistance value set between given terminal sections 41, which are a pair of electrodes associated with a given resistive portion 31, and a resistance value set between given terminal sections 42, which are a pair of electrodes associated with a given resistive portion 32 facing the given resistive portion 31, continuously varies in accordance with elastic deformation of the member 51 due to a given shear force. Based on variations in the difference between the resistance values, slip occurring between the substrate 11 and a given contacted object can be detected.

The sum of the resistance value set between the pair of terminal sections 41 associated with a given resistive portion 31 and the resistance value set between the pair of terminals 42 associated with a given resistive portion 32 facing the given resistive portion 31 continuously varies in accordance with elastic deformation of the member 51 due to a given compressive force. Based on variations in the sum of the resistance values, the magnitude of a given force to press the substrate 11 by a contacted object can be detected.

A difference between the resistance value set between given terminal sections 43, which are a pair of electrodes associated with a given resistive portion 33, and a resistance value set between given terminal sections 44, which are a pair of electrodes of a given resistive portion 34 facing the given resistive portion 33, continuously varies in accordance with elastic deformation of the member 51 due to a given shear force. Based on variations in the difference between the resistance values, slip occurring between the substrate 11 and a given contacted object can be detected.

The sum of the resistance value set between the pair of terminal sections 43 associated with a given resistive portion 33 and the resistance value set between the pair of terminals 44 associated with a given resistive portion 34 facing the given resistive portion 33 continuously varies in accordance with elastic deformation of the member 51 due to a given compressive force. Based on variations in the sum of the resistance values, the magnitude of a given force to press the substrate 11 by a given contacted object can be detected.

The materials, thicknesses, and manufacturing method of the resistive portions 33 and 34 can be same as the materials, thicknesses, and manufacturing method of the resistive portions 31 and 32. Note that given resistive portions 31 and 33 may intersect while not being required to be perpendicular to each other in a plan view, and given resistive portions 32 and 34 may intersect while not being required to be perpendicular to each other in a plan view.

As described above, in the slip sensor 1E, in addition to the resistive portions 31 and 32 of which the longitudinal direction of each is directed to the Y direction, the resistive portions 33 and 34 of which the longitudinal direction of each is directed to the X direction are provided. In such a manner, the slip sensor 1E can calculate slip in the X direction based on the difference in the resistance value between a given resistive portion 31 and given resistive portion 32 that are opposed to each other. Further, the slip sensor 1E can calculate slip in the Y direction based on the difference in the resistance value between a given resistive portion 33 and given resistive portion 34 that are opposed to each other. Further, XY coordinates of a given location where slip occurs can be also detected.

For the slip sensor 1E, the number of elastically deformable members can be one less than that set for the slip sensor 1D. Thus, the slip sensor 1E is advantageous from the viewpoint of reduced sizes and low profiles.

Figure 15:
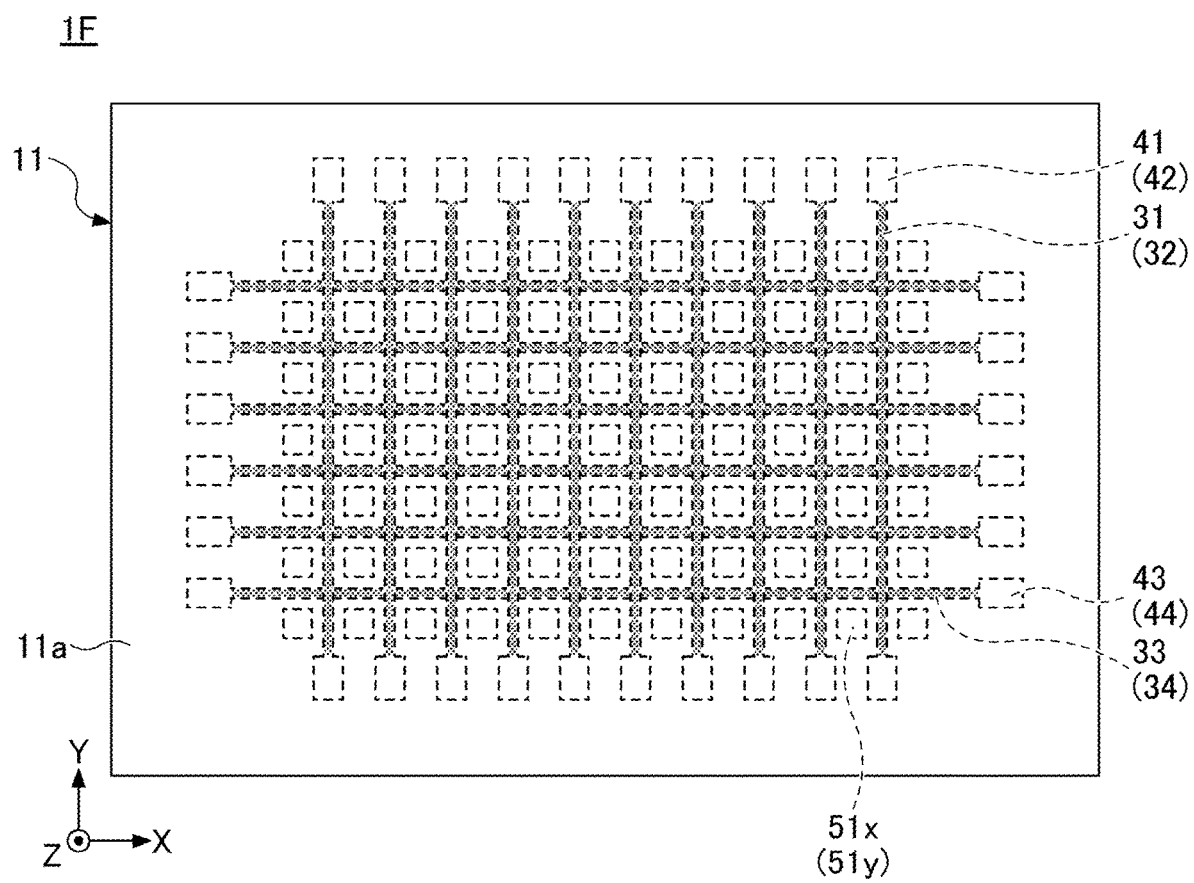
FIG. 15 is a plan view (second part) illustrating an example of the slip sensor according to the third modification of the first embodiment.

Note that for example, as illustrated in FIG. 15, each recessed portion 51x to recess the substrate 15-side surface of the member 51 toward the substrate 12-side surface of the member 51 may be provided in a given region among regions of the member 51 on both sides of a given resistive portion 31 and on both sides of a given resistive portion 33. Also, each recessed portion 51y to recess the substrate 12-side surface of the member 51 toward the substrate 15-side surface of the member 51 may be provided in a given region among regions of the member 51 on both sides of a given resistive portion 32 and on both sides of a given resistive portion 34. Alternatively, only recessed portions 51x may be provided without providing any recessed portion 51y. In any case, for the slip sensor 1E, sensitivity for detecting slip in the X direction, as well as sensitivity for detecting slip in the Y direction, can be improved.

Example of Attachment of Slip Sensor

Figure 16:
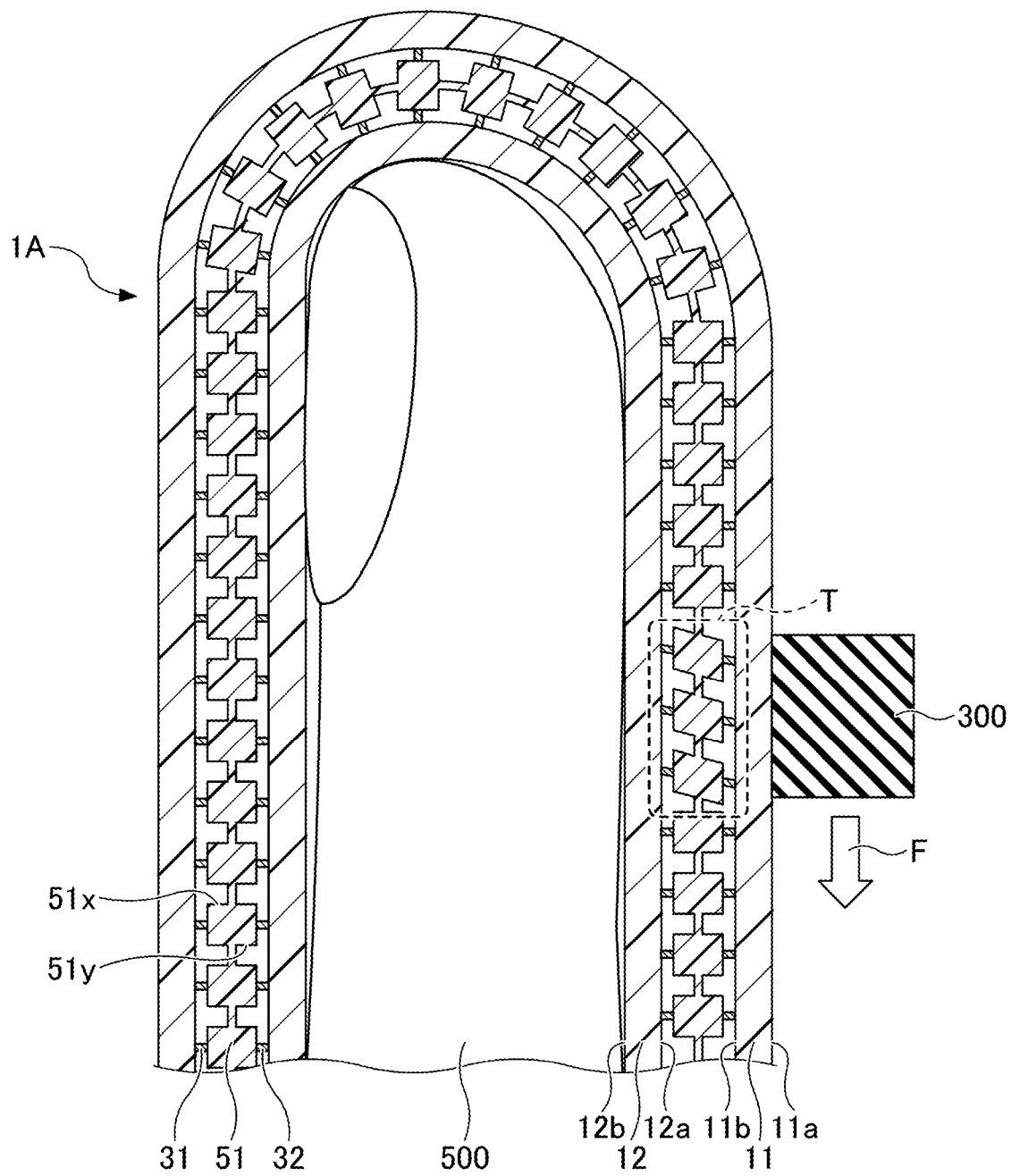
FIG. 16 is a diagram (first part) illustrating an example of attachment of the slip sensor.

FIG. 16 is an example of the slip sensor 1A illustrated in FIG. 8 that is formed in an elongated shape and that is attached to a person's finger 500. Note that instead of the slip sensor 1A, the slip sensor 1, 1B, 1C, or 1D may be attached.

In FIG. 16, a state in which the substrate 12-side of the member 51 is not deformed substantially is illustrated, where in a state of the slip sensor 1A in contact with a contacted object 300, a force F is applied in the direction expressed by the arrow, and the substrate 11-side of the member 51 in the region T proximal to an applied location of the force F is deformed in the direction of the force F.

As described above, the slip sensor 1A is thin and flexible. Thus, the slip sensor 1A can be easily attached to a non-flat object such as a person's finger 500. By attaching the slide sensor 1A to the person's finger 500, slip of the contacted object 300 in contact with the slide sensor 1A can be detected.

Figure 17:
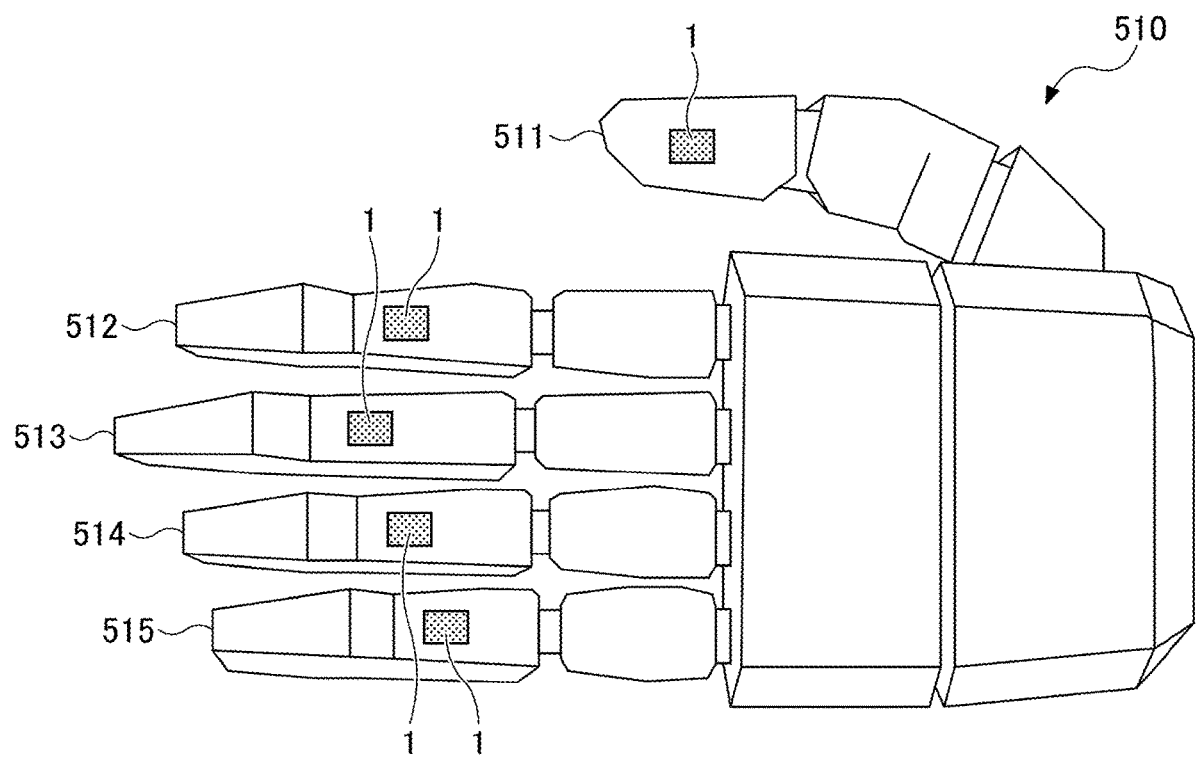
FIG. 17 is a diagram (second part) illustrating an example of the attachment of the slip sensor.
Figure 18:
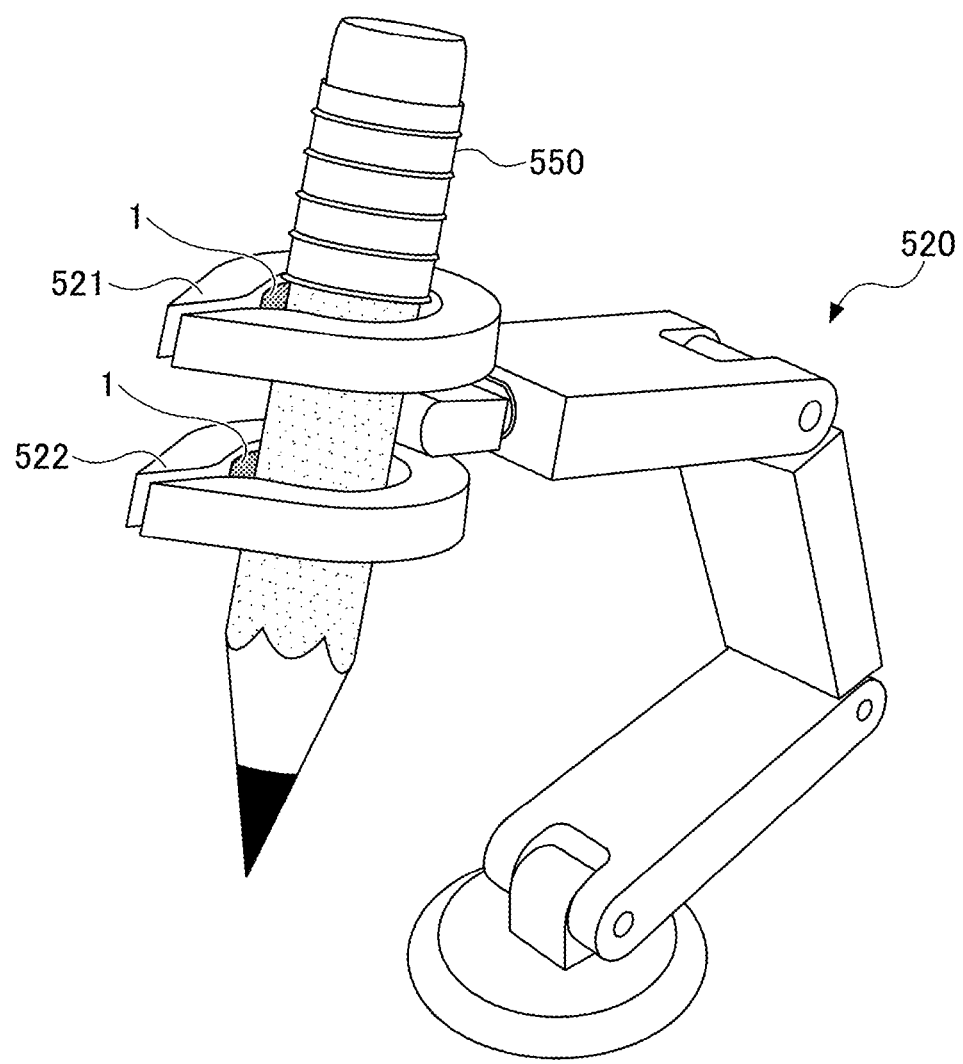
FIG. 18 is a diagram (third part) illustrating an example of attachment of the slip sensor.

FIG. 17 illustrates an example of the slip sensor 1 illustrated in FIG. 1 that is attached to each of five grasping portions (fingers) 511 to 515 of a robot hand 510. FIG. 18 is an example of the slip sensor 1 illustrated in FIG. 1 that is attached to each of two grasping portions 521 and 522 of a robot hand 520. Note that instead of the slip sensor 1, the slip sensor 1A, 1B, 1C, or 1D may be attached.

When a given object (such as a pencil 550 in FIG. 18) to be grasped with each of the robot hands 510 and 520 differs in hardness or weight, in a case where a given robot hand among the robot hands 510 and 520 is operated through a fixed force, regardless of the given grasped object, the grasped object might be damaged, or the grasped object might be dropped.

In light of the point described above, a given grasping force of each grasping portion of a given robot hand among the robot hands 510 and 520 needs to be adjusted in consideration of a given grasped object. In this regard, with use of the slip sensor 1 to detect slip between a given grasping portion and the given grasped object, the grasping force to be applied by each grasping portion of each of the robot hands 510 and 520 can be adjusted appropriately.

For example, when the slip sensor 1 detects slip, the grasping force of a given grasping portion of each of the robot hands 510 and 520 can be controlled to increase. By adjusting the grasping force of the given grasping portion of each of the robot hands 510 and 520, to a value to the minimum extent possible to detect slip, damage to the grasped object or dropping of the grasped object can be prevented.

The preferred embodiment and the like have been described above in detail, but are not limiting. Various modifications or substitutions to the embodiment and the like described above can be made without departing from a scope set forth in the claims.

This International Application claims priority to Japanese Patent Application No. 2018-158607, filed Aug. 27, 2018, the contents of which are incorporated herein by reference in their entirety.

REFERENCE SIGNS LIST 1, 1A, 1B, 1C, 1D, 1E, 1F slip sensor, 7 controller, 8 slip sensor module, 11, 12, 13, 15 substrate, 11a, 12a, 13a, 15a upper surface of substrate, 11b, 12b, 13b, 15b lower surface of substrate, 20a, 20b functional layer, 31, 32, 33, 34 resistive portion, 41, 42, 43, 44 terminal section, 51, 52 member, 51x, 51y recessed portion, 71 analog front end unit, 72 signal processing unit

The invention claimed is:
1. A slip sensor comprising:
a first insulating layer of which one side is a side of receiving a force and of which another side includes multiple first resistive portions, the first resistive portions, of which a longitudinal direction of each is directed to a first direction, being juxtaposed;
a second insulating layer of which one side includes multiple second resistive portions, the second resistive portions, of which a longitudinal direction of each is directed to the first direction, being juxtaposed;
a member disposed between the another side of the first insulating layer and the one side of the second insulating layer, the member being configured to elastically deform in accordance with the force;
a pair of first electrodes provided on respective end portions of each of the first resistive portions; and
a pair of second electrodes provided on respective end portions of each of the second resistive portions, the pair of second electrodes being different from the pair of first electrodes,
wherein each first resistive portion is disposed facing a given second resistive portion, the member being provided between a given first resistive portion and the given second resistive portion, and
wherein at least one among a first resistance value set between a given pair of first electrodes associated with a given first resistive portion and a second resistance value set between a given pair of second electrodes associated with a given second resistive portion facing the given first resistive portion continuously varies in accordance with elastic deformation of the member that is caused by a shear force, so that a difference between the first resistance value and the second resistance value continuously varies.

2. The slip sensor according to claim 1, wherein the sum of the resistance value set between the given pair of electrodes associated with the given first resistive portion and the resistance value set between the given pair of electrodes associated with the given second resistive portion facing the given first resistive portion continuously varies in accordance with elastic deformation of the member that is caused by a compressive force.

3. The slip sensor according to claim 1, wherein recessed portions to recess a first insulating layer-side surface of the member, toward a second insulating layer-side surface of the member are provided in regions of the member positioned on both sides of a given first resistive portion.

4. The slip sensor according to claim 3, wherein recessed portions to recess the second insulating layer-side surface of the member, toward the first insulating layer-side surface of the member are provided in regions of the member positioned on both sides of a given second resistive portion.

5. The slip sensor according to claim 1, further comprising multiple third resistive portions of which a longitudinal direction of each is directed to a second direction intersecting with the first direction, the third resistive portions being juxtaposed on another side of the second insulating layer;
a third insulating layer of which one side includes multiple fourth resistive portions, the fourth resistive portions, of which a longitudinal direction of each is directed to the second direction, being juxtaposed; and
a second member disposed between the another side of the second insulating layer and the one side of the third insulating layer, the second member being configured to elastically deform in accordance with the force,
wherein each third resistive portion is disposed facing a given fourth resistive portion, the second member being provided between a given third resistive portion and the given fourth resistive portion,
wherein a pair of electrodes is provided on both end portions of each of the third resistive portions and the fourth resistive portions, and
wherein a difference between a resistance value set between a given pair of electrodes associated with a given third resistive portion and a resistance value set between a given pair of electrodes associated with a given fourth resistive portion facing the given third resistive portion continuously varies in accordance with elastic deformation of the second member that is caused by a shear force.

6. The slip sensor according to claim 5, wherein the sum of the resistance value set between the given pair of electrodes associated with the given third resistive portion and the resistance value set between the given pair of electrodes associated with the given fourth resistive portion facing the given third resistive portion continuously varies in accordance with elastic deformation of the second member that is caused by a compressive force.

7. The slip sensor according to claim 5, wherein recessed portions to recess a second insulating layer-side surface of the second member, toward a third insulating layer-side surface of the second member are provided in regions of the second member positioned on both sides of a given third resistive portion.

8. The slip sensor according to claim 7, wherein recessed portions to recess the third insulating layer-side surface of the second member, toward the second insulating layer-side surface of the second member are provided in regions of the second member positioned on both sides of a given fourth resistive portion.

9. The slip sensor according to claim 1, further comprising a third insulating layer of which another side includes multiple third resistive portions, the third resistive portions, of which a longitudinal direction of each is directed to a second direction intersecting with the first direction, being juxtaposed,
wherein one side of the third insulating layer is disposed on the another side of the first insulating layer, via the first resistive portions,
wherein the member is disposed between the another side of the third insulating layer and the one side of the second insulating layer,
wherein multiple fourth resistive portions of which a longitudinal direction of each is directed to the second direction are juxtaposed on the another side of the second insulating layer,
wherein each third resistive portion is disposed facing a given fourth resistive portion, the member being provided between a given third resistive portion and the given fourth resistive portion,
wherein a pair of electrodes is provided on both end portions of each of the third resistive portions and the fourth resistive portions, and
wherein a difference between a resistance value set between a given pair of electrodes associated with a given third resistive portion and a resistance value set between a given pair of electrodes associated with a given fourth resistive portion facing the given third resistive portion continuously varies in accordance with elastic deformation of the member that is caused by a shear force.

10. The slip sensor according to claim 9, wherein the sum of the resistance value set between the given pair of electrodes associated with the given third resistive portion and the resistance value set between the given pair of electrodes associated with the given fourth resistive portion facing the given third resistive portion continuously varies in accordance with elastic deformation of the member that is caused by a compressive force.

11. The slip sensor according to claim 9, wherein each recessed portion to recess a third insulating layer-side surface of the member, toward a second insulating layer-side surface of the member is provided in a given region among regions of the member positioned on both sides of a given first resistive portion and on both sides of a given third resistive portion.

12. The slip sensor according to claim 11, wherein each recessed portion to recess the second insulating layer-side surface of the member, toward the third insulating layer-side surface of the member is provided in a given region among regions of the member positioned on both sides of a given second resistive portion and on both sides of a given fourth resistive portion.

13. The slip sensor according to claim 5, wherein each of the third resistive portions and the fourth resistive portions is formed of a Cr composite film.

14. The slip sensor according to claim 1, wherein each of the first resistive portions and the second resistive portions is formed of a Cr composite film.

15. The slip sensor according to claim 13, wherein a main component of the Cr composite film is alpha-chromium.

16. The slip sensor according to claim 15, wherein the Cr composite film includes alpha-chromium at 80% by weight or more.

17. The slip sensor according to claim 15, wherein the Cr composite film includes chromium nitride.

18. The slip sensor according to claim 13, further comprising a functional layer formed of metal, an alloy, or a metal compound, in a lower layer of the Cr composite film.

19. The slip sensor according to claim 18, wherein the functional layer includes a function of promoting crystal growth of the Cr composite film.

* * * * *